(12) United States Patent
Jung et al.

(10) Patent No.: US 8,038,376 B2
(45) Date of Patent: Oct. 18, 2011

(54) CONNECTION ELEMENT FOR A SCREWED CONNECTION AS WELL AS SUCH A SCREWED CONNECTION

(75) Inventors: Alexander Jung, Diez-Hambach (DE); Igor Gascov, Limburg (DE)

(73) Assignee: Pee-Wee Kaltwalz- und Rohrbearbeitungsmaschinen GmbH, Diez (DE)

( * ) Notice: Subject to any disclaimer, the term of this patent is extended or adjusted under 35 U.S.C. 154(b) by 234 days.

(21) Appl. No.: 12/240,340

(22) Filed: Sep. 29, 2008

(65) Prior Publication Data
US 2009/0304478 A1 Dec. 10, 2009

(30) Foreign Application Priority Data
Jun. 6, 2008 (DE) .......................... 10 2008 027 297

(51) Int. Cl.
*F16B 39/30* (2006.01)
(52) U.S. Cl. ........................................ 411/308; 411/938
(58) Field of Classification Search .......... 411/308–310, 411/411, 336, 387.3, 938
See application file for complete search history.

(56) References Cited

U.S. PATENT DOCUMENTS

| | | | |
|---|---|---|---|
| 2,581,690 A | 1/1952 | Moehle et al. | |
| 3,687,183 A | 8/1972 | Rohm | |
| RE27,678 E * | 6/1973 | Orlomoski | 411/311 |
| 3,789,644 A | 2/1974 | Orlomoski | |
| 3,850,215 A | 11/1974 | Orlomoski | |
| 3,972,361 A * | 8/1976 | Ollis, Jr. | 411/277 |
| 3,982,575 A * | 9/1976 | Ollis et al. | 411/310 |
| 4,637,767 A * | 1/1987 | Yaotani et al. | 411/411 |
| 4,653,968 A * | 3/1987 | Rapata et al. | 411/247 |
| 5,141,376 A * | 8/1992 | Williams et al. | 411/387.4 |
| 6,863,483 B2 * | 3/2005 | Koenig et al. | 411/311 |
| 6,974,289 B2 * | 12/2005 | Levey et al. | 411/310 |
| 6,976,818 B2 * | 12/2005 | Levey et al. | 411/412 |
| 7,156,600 B2 * | 1/2007 | Panasik et al. | 411/411 |
| 7,163,366 B2 * | 1/2007 | Chen | 411/417 |
| 7,246,979 B2 * | 7/2007 | Fujii et al. | 411/310 |
| 7,338,243 B2 * | 3/2008 | Gerhard | 411/387.4 |

FOREIGN PATENT DOCUMENTS

| | | |
|---|---|---|
| CH | 546351 | 2/1974 |
| DE | 4039402 | 6/1992 |
| DE | 102005041586 A1 | 3/2007 |
| EP | 1391617 A1 | 2/2004 |

* cited by examiner

*Primary Examiner* — Gary Estremsky
(74) *Attorney, Agent, or Firm* — Connolly Bove Lodge & Hutz LLP

(57) ABSTRACT

A connection element (1) has a thread (2) that can be made to engage with a mating thread such as, for instance, a nut. The thread includes locking means (3) that acts upon the mating thread. The locking means (3) are formed by flanks (4, 5; 6, 7, 8, 9) of at least one section (10; 11) of the thread (2) whose arrangement with respect to each other is changed vis-à-vis the arrangement of the flanks (18, 19) of the thread (2) outside of the locking section (10; 11) in such a way that, when the thread (2) engages with the mating thread, a locking force is generated on at least one of the flanks (4, 5; 6, 7, 8, 9) of the locking section (10; 11).

15 Claims, 5 Drawing Sheets

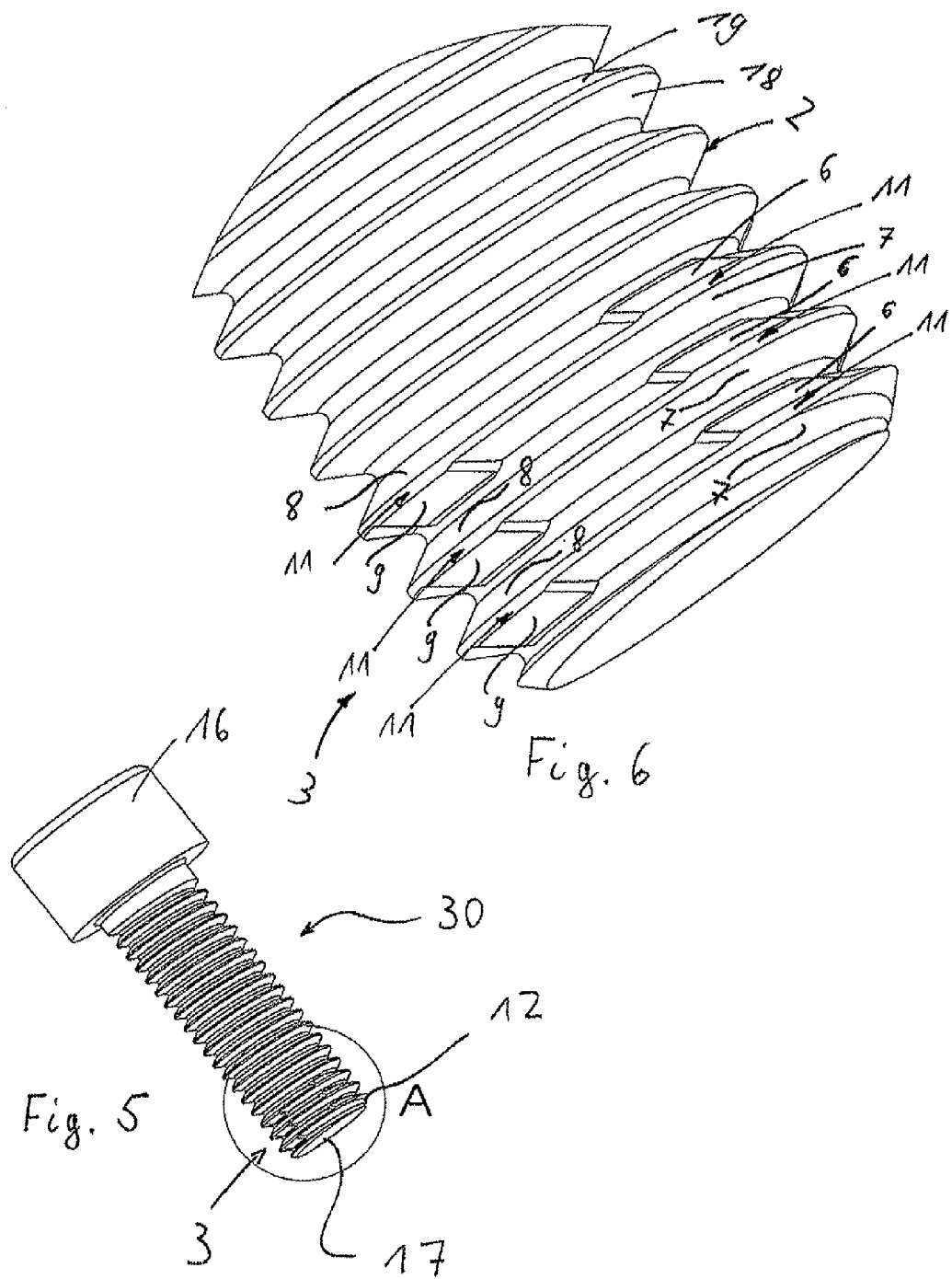

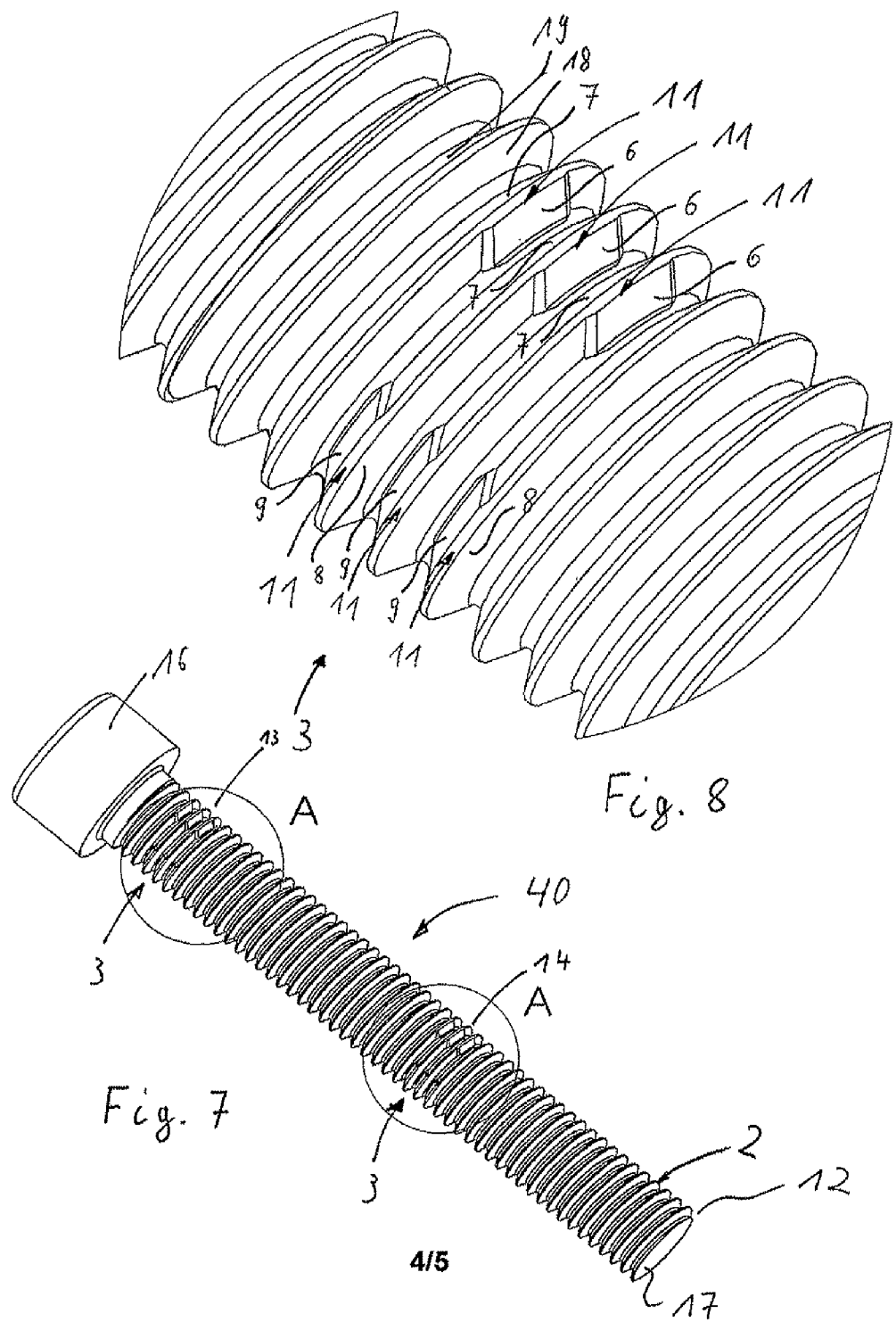

CONNECTION ELEMENT FOR A SCREWED CONNECTION AS WELL AS SUCH A SCREWED CONNECTION

The invention relates to a connection element having a thread that can be made to engage with a mating thread such as, for instance, a nut, and having means to generate a locking force that acts upon the mating thread. The invention also relates to a screwed connection having such a connection element.

BACKGROUND OF THE INVENTION

State of the Art

Such a connection element in the form of a screw is already disclosed in German patent application DE 40 39 402 A1. The thread of the screw is described as a so-called self-locking thread. The self-locking thread prevents an unintentional self-loosening of the screw from a component that is screwed to it. Such a self-loosening occurs when the thread and the mating thread inter-engage with a certain amount of play. Shaking or similar vibrations then bring about a relative movement between the screw and the component that has the mating thread. In order to prevent such a relative movement, the prior-art screw provides that the thread has an offset in the axial direction of the screw along at least one section of the winding relative to the rest of the thread. As a result, the thread and the mating thread engage with each other without clearance, at least in the offset section of the winding.

The prior-art screw with a self-locking thread is manufactured by means of a rolling method employing rolling dies. In order to be able to manufacture the axially offset section of the thread, the rolling die has an insert. The insert is accommodated in the rolling die in such a way that it is movable. By appropriately moving the insert in the rolling die, it is possible to create the axial offset of the winding section when the screw is being shaped. Therefore, not only the rolling die but also the insert is needed in order to manufacture the prior-art screw. Moreover, a receptacle for the insert has to be created in the rolling die with great precision. Consequently, the production of the prior-art screw with its self-locking thread calls for a relatively complex tool.

One object of the invention is to provide a connection element that has the above-mentioned features and that can be created in a simple manner, particularly with a simple tool.

BRIEF SUMMARY OF THE INVENTION

The connection element has a thread that can be made to engage with a mating thread such as, for instance, a nut. It also has means to generate a locking force that acts upon the mating thread. The connection element is characterized, among other things, in that the locking means are formed by the flanks of at least one section of the thread whose arrangement with respect to each other is changed vis-à-vis the arrangement of the flanks of the thread outside of the section or of the locking section in such a way that, when the thread engages with the mating thread, the locking force is generated on at least one of the flanks of the locking section.

As a result of this measure, the connection element with its locking means can be manufactured in a simple manner since, in order to do so, it is sufficient to merely change the arrangement of the flanks with respect to each other in the section of the thread that brings about the locking effect. When the mating thread engages with that section of the thread of the connection element, this creates a non-positive connection between the thread and the mating thread, especially in the area of the flanks of the thread and of the mating thread that correspond to each other. The approach employed so far consisting of moving the entire thread profile along a prescribed section of the thread is not necessary in order to implement the measure according to the invention. Consequently, the connection element according to the invention can be produced with the simplest of tools, since those changes in the arrangement of the flanks in the locking section of the connection element can already be made without any problem by simply grinding the appropriate contour into the tool. Therefore, for purposes of producing the connection element according to the invention, simpler tools can be used than are needed for the manufacture of the connection elements known so far, with their axial offset thread section.

According to a first embodiment of the invention, it is provided that the flanks of the at least one locking section are arranged with respect to each other in such a way that, when the thread and the mating thread are in the engaged state, the connection element is held in the mating thread in a manner that it is secured against turning. As a result, merely the at least one flank of the locking section that generates the locking force is already sufficient to undetachably lock the connection element with respect to the component that has the mating thread. In this manner, a self-locking of the connection element is achieved with respect to the component that has the mating thread. This self-locking can be configured in such a way that the forces that normally act upon the connection element and/or the component that has the mating thread holds the connection element and the component together in a manner that it is secured against turning. Preferably the self-locking can be overcome, provided that a prescribed tightening torque acting upon the connection element and/or the component that has the mating thread is greater than the counter torque generated by the non-positive connection between the thread and the mating thread.

According to another embodiment of the invention, it is provided that the arrangement of one of the flanks of the at least one locking section is changed with respect to the other flank of the locking section. With this approach, the locking means is created particularly simply and with little effort since only one of the flanks is changed in the area that causes the locking.

It can also be provided that the arrangement of both flanks of the locking section are changed relative to each other. This makes it possible to attain a non-positive connection with the mating thread along both flanks, so that a particularly strong locking effect is achieved between the thread and the mating thread. Moreover, this counteracts any deformations of the mating thread that might occur when the thread engages with the mating thread, since the locking forces engage both thread flanks of the mating thread. This avoids one-sided stress on the thread flanks of the mating thread.

Several embodiments are an option when it comes to the orientation of the flanks of the at least one locking section with respect to each other. In an advantageous manner, it is provided that the flanks of the locking section are arranged so as to run essentially in opposite directions with respect to each other. It has been found that such an orientation of the flanks is easier to create from the standpoint of production.

Another possibility is for the flanks of the locking section to be oriented essentially identically with respect to each other. Such an orientation of the flanks of the locking section makes it possible to flexibly adapt the thread to the mating thread with a great deal of tolerance so that the locking force according to the invention can be achieved even with such combinations of the thread and the mating thread.

According to another embodiment of the invention, it is provided that the at least one flank of the locking section that generates the locking force is offset towards the outside. This offset allows the flank to have full-surface contact with the corresponding flank of the mating thread, as a result of which the locking effect achieved is particularly strong. Furthermore, owing to the at least one flank that is offset towards the outside, the thread in the locking section has a profile that is configured to be wider than the profile of the thread outside of the locking section. In other words, due to the offset of the at least one flank, when viewed in a cross section, the tooth that forms the thread is configured wider than outside of the locking section; for instance, the winding of the thread in the locking section is configured to be thicker than the winding outside of the locking section, and/or the at least one flank of the locking section is configured as a projection with respect to the flank outside of the locking section. This allows maximum locking forces to be generated without this causing damage to the thread in the locking section.

In this context, the possibility exists that, for purposes of generating the locking force, both flanks of the locking section are offset towards the outside. This allows an even more sturdy locking connection between the thread and the mating thread. As a consequence, especially high forces can be generated without this causing damage to the connection element.

It likewise lends itself for the at least one flank that generates the locking force to be offset essentially in parallel with respect to the flank outside of the locking section. Such an embodiment can be achieved particularly easily from the standpoint of production.

According to another embodiment of the invention, it is provided that the locking section extends along at least one winding of the thread. As a result, the locking force acts upon the mating thread along the entire circumference of the connection element, so that, when the thread and the mating thread are in the locked state, the connection element is oriented essentially exactly with respect to the component that has the mating thread. This is particularly advantageous in the case of threads and mating threads that have a relatively large dimensional tolerance since, for instance, locking means that act upon the mating thread along only part of a thread pitch can give rise to a slanted positioning of the connection element with respect to the component that has the mating thread.

According to another embodiment of the invention, it is provided that one winding of the thread has several locking sections. This reduces the active area of the one winding that comes into effective contact with the mating thread and brings about the locking effect. Less material wear and tear occurs in the thread of the connection element. By the same token, the systematic placement of the locking sections at various places of a winding of the thread can translate into a particularly strong locking connection between the thread and the mating thread, as a result of which especially the service life of the thread of the connection element is greatly prolonged. This is so because a reliable and sturdy self-locking of the thread vis-à-vis the mating thread exists, even when the forces that act upon the connection element and/or on the component that has the mating thread are constantly changing.

For this purpose, one winding of the thread preferably has at least two locking sections, preferably four locking sections, in order to achieve a particularly sturdy locking connection between the thread and the mating thread, even if the acting forces are constantly changing. In this context, preferably several locking sections are to be distributed along the winding.

According to another embodiment of the invention, it is provided that, in the case of several locking sections of one winding of the thread, one of the flanks of the appertaining locking section forms the flank that generates the locking force. As a result, in spite of the multiple locking sections provided along a winding, the locking effect can be achieved with relatively little manufacturing effort.

An option here is for one of the two flanks of the appertaining locking sections to alternatingly form the flank that generates the locking force. Since the locking sections of one winding are alternatingly responsible for generating the locking force with one flank and then with the other flank of the appertaining locking section, a particularly efficient and low-stress locking effect is achieved with the mating thread. After all, the locking forces act upon the mating thread in a manner that is uniformly distributed along the winding, despite the fact that, as viewed over one winding, there is only one flank per locking section that generates the locking force. Here, both mating flanks of the mating thread are exposed to the locking force, which alleviates the stress on the mating thread.

According to another advantageous embodiment of the invention, it is provided that at least two consecutive windings of the thread have locking sections. As a result, the force needed to screw in the connection element is changed, especially increased, in a targeted and flexible manner as a function of the screwing depth of the connection element.

In this context, it lends itself for the facing flanks of adjacent windings to form the flanks of the locking sections that generate the locking force. This measure already allows the locking force to develop to a great extent without this requiring both flanks of the locking sections to be configured for generating the locking force.

When it comes to attaining a particularly strong locking force effect along the circumference of the thread, it is especially advantageous for the flanks of adjacent windings that generate the locking force to be arranged offset with respect to each other.

Here, it lends itself for the locking sections of adjacent windings to be arranged essentially identically with respect to each other. With this approach, it is relatively easy in terms of the production to implement the multiple locking sections that are provided on adjacent windings.

According to another embodiment of the invention, it is provided that at least one winding without locking means is located between the windings with locking means. This allows the connection element to be screwed in up to a prescribable screwing depth with a greater application of force, which can be brought to bear by the first locking means. An additionally increased application of force when the connection element is screwed in can become necessary when the next windings that have locking means are made to engage with the mating thread.

In the connection element according to the invention, the thread can be configured in the form of a unified screw thread, a buttress thread, a knuckle thread, an acme thread or a Whitworth thread. Fundamentally, the locking means provided according to the invention can be implemented in all kinds of threads.

The connection element can be produced especially easily if it is configured as a cold-formed part, particularly as a rolled formed part.

Preferably, the connection element is part of a screwed connection with a component that has a mating thread, especially a nut or a plate-shaped part, whose mating thread is made to engage with the thread of the connection element.

DESCRIPTION OF THE DRAWINGS

Additional objectives, advantages, features and application possibilities of the present invention ensue from the description below of several embodiments making reference to the drawings. Here, all of the described and/or illustrated features, either alone or in any meaningful combination, constitute the subject matter of the invention, also irrespective of their compilation in the claims or of their referral back to other claims.

The following is shown:

FIG. 5—a perspective view of yet another embodiment of a connection element with a thread and locking means;

FIG. 6—an enlarged section of detail A of the connection element according to FIG. 5;

FIG. 7—a perspective view of yet another embodiment of a connection element with a thread and two areas provided in the axial direction for purposes of locking vis-à-vis a mating thread;

FIG. 8—an enlarged section of detail A of the connection element according to FIG. 7;

DETAILED DESCRIPTION OF THE INVENTION

Figure 1:
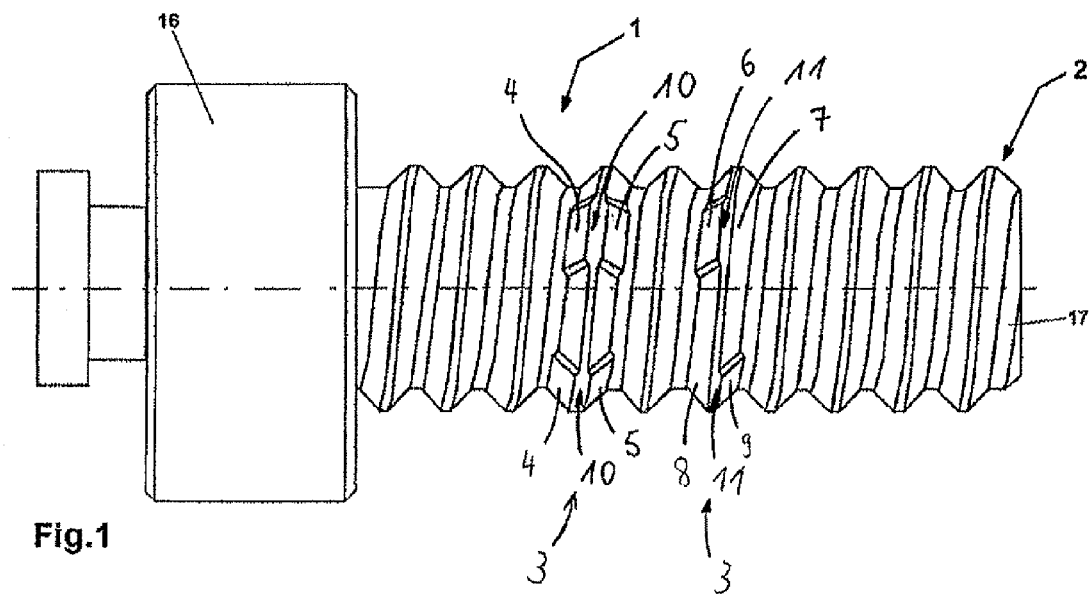
FIG. 1—a side view of a possible embodiment of a connection element for a screwed connection with a thread and locking means.
Figure 2:
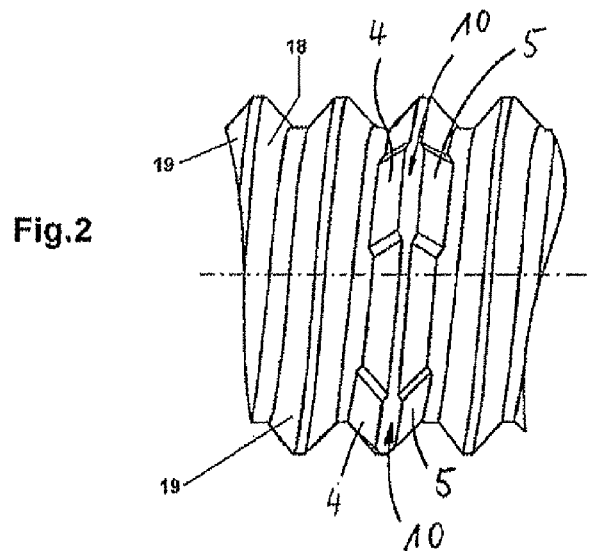
FIG. 2—an enlarged section of the connection element according to FIG. 1.

In a schematic depiction, FIGS. 1 and 2 show a possible embodiment of a connection element 1 with a thread 2 that can be made to engage with a mating thread (not shown here). The connection element 1 is configured in the form of a screw, having a shaft 17 and a head 16. The thread 2 of the shaft 17 is configured as a conventional metric thread that is formed as a full profile in the shaft 17.

The connection element 1 can naturally also be a threaded rod, a threaded spindle or a threaded component of this kind. In this context, the invention is not restricted to a connection element with an outer thread. On the contrary, the invention also encompasses connection elements that have inner threads.

The connection element 1 has means 3 to generate a locking force that acts upon the mating thread (not shown here). In the embodiment according to FIG. 1, two different configurations of the locking means 3 are shown which can also be implemented separately on connection elements, independently of each other. The locking means 3 of the two versions are formed by the flanks 4, 5 or 6, 7 or 8, 9 of at least one section or winding section 10 or 11 of the thread 2.

In the locking means 3 of the two configurations according to FIGS. 1 and 2, the arrangement of the facing flanks 4, 5 or 6, 7 or 8, 9 with respect to each other is changed vis-à-vis the arrangement of the flanks 18, 19 of the thread 2 outside of the locking section 10 or 11 in such a way that, when the thread 2 engages with the mating thread (not shown here), the locking force is generated on at least one of the flanks 4, 5 or 6, 7 or 8, 9 of the locking section 10, 11. Consequently, when the thread 2 engages with the mating thread (not shown here), the locking force present prevents a relative movement of the connection element 1 relative to the component (not shown here) with the mating thread, thus avoiding an unintentional loosening of the screwed connection consisting of the thread 2 and the mating thread (not shown here).

The two embodiments of the locking means 3 shown in FIG. 1 differ, among other things, in that, in one of the embodiments, the arrangement of the two flanks 4, 5 of the locking section 10 with respect to each other is changed and thus both flanks 4, 5 of the section 10 are configured to generate a locking force upon the mating thread (not shown here). In contrast to this, in the other embodiment, only the arrangement of the flank 6 or 9 of the locking section 10 relative to the other flank 7 or 8 of the locking section 10 is changed, so that, in this case, only one flank 6 or 9 of the locking section 11 is configured to generate a locking force upon the mating thread (not shown here).

Preferably, the flanks 4, 5 or 6, 9 of the locking sections 10, 11 that generate the locking force are arranged offset towards the outside. Preferably, the flanks 4, 5 or 6, 9 of the locking sections 10, 11 that generate the locking force are also offset essentially in parallel towards the outside with respect to the flanks 18, 19 (see FIG. 2) outside of the locking section 10, 11.

Among other things, the two configurations of the locking means 3 according to FIG. 1 have in common the fact that one winding of the thread 2 has several of the locking sections 10 or 11. Preferably, the locking sections 10 or 11 are distributed along this one winding. A winding in the context of the invention refers to the course of the thread once around the shaft 17 of the connection element 16. In both configurations of the locking means 3 according to FIG. 1, four locking sections 10 or 11 are provided in each case along one winding of the thread 2, and preferably they are distributed uniformly along the winding.

In the case of the configuration of the locking means 3 according to FIG. 1 having the locking sections 11, the latter are advantageously arranged along the winding of the thread 2 in such a way that locking sections 11 having the flank 9 that generates the locking force alternate with locking sections 11 having the other flank 6 that generates the locking force. In this context, the flanks 6 and the flanks 9 of the locking sections 11 are offset towards the outside in opposite directions with respect to each other. In other words, the flanks 6, 9 of the locking sections 11 that generate the locking force are distributed so as to be offset with respect to each other along one winding. Therefore, in another configuration of the locking means 3 having the locking sections 11, four flanks that generate the locking force are provided along one winding. In contrast to this, the locking sections 10 of the other configuration have eight flanks that generate the locking force along one winding. Here, the appertaining adjacent locking sections 10 or 11 lie at a right angle with respect to each other.

Naturally, the invention is not restricted to this number of flanks that generate the locking force. Rather, along one winding of the thread 2, there could also be 12, 16, 20 or more flanks that generate the locking force.

Figure 4:
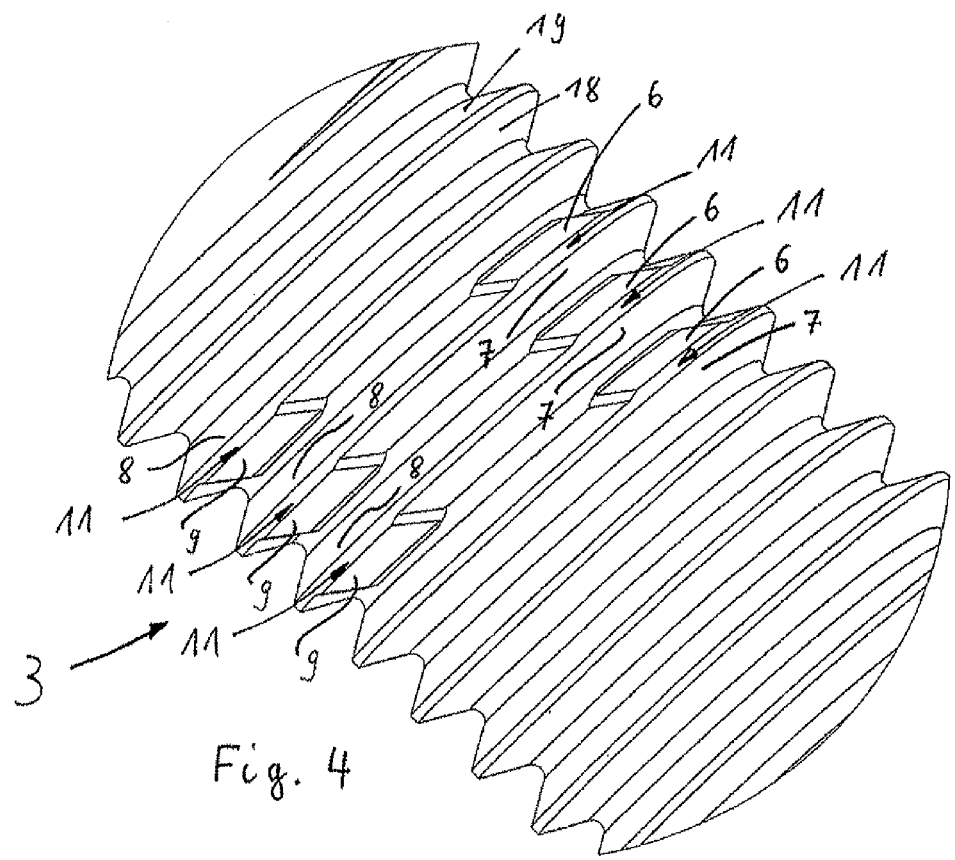
FIG. 4—an enlarged section of detail A of the connection element according to FIG. 3.
Figure 3:
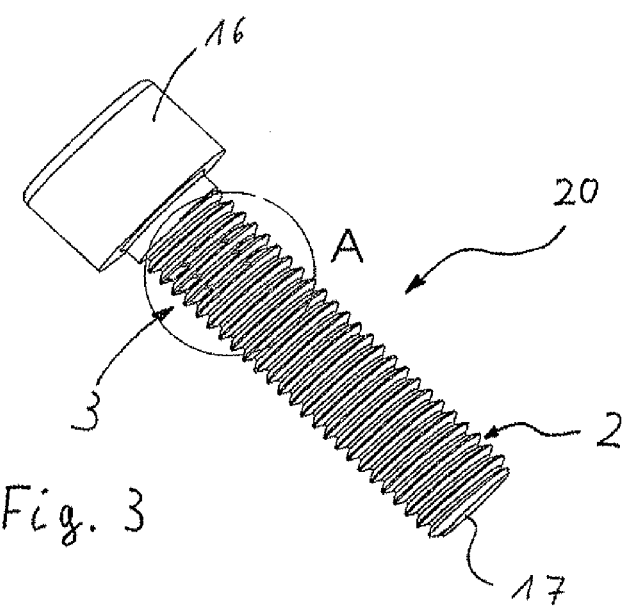
FIG. 3—a perspective view of another possible embodiment of a connection with a thread and locking means.

In a schematic depiction, FIGS. 3 and 4 show another embodiment of a connection element 20. The features of the embodiment according to FIGS. 3 and 4 that are identical to the features of the connection element 1 according to FIGS. 1 and 2 have been provided with the same reference numerals; in this context, reference is hereby made to the description relating to FIGS. 1 and 2.

The connection element 20 according to FIGS. 3 and 4 differs from the connection element 1 according to FIGS. 1 and 2, among other things, in that the locking sections 11 are provided on three consecutive windings of the thread 2. Here, the facing flanks of adjacent windings are arranged in the same way with respect to each other and preferably form an essentially straight row in the axial direction of the connection element 20.

Moreover, in the connection element 20 according to FIGS. 3 and 4, it is provided that the locking means 3, as viewed in the axial direction, are provided in the rear area of the thread 2 that faces the head 16 of the connection element 20.

In a schematic depiction, FIGS. 5 and 6 show yet another embodiment of a connection element 30. The features of the connection element 30 that are identical to the features of the connection element 20 according to FIGS. 3 and 4 and/or to the connection element 1 according to FIGS. 1 and 2 have been provided with the same reference numerals; in this context, reference is hereby made to the description relating to FIGS. 1 and 2 as well as 3 and 4.

The connection element 30 according to FIGS. 5 and 6 differs from the connection element 20 according to FIGS. 3 and 4, among other things, in that the locking means 3 are arranged in the area of the free end of the shaft 17 of connection element 30. In this context, preferably the first three windings of the thread 2 are provided with the locking sections 11.

The arrangement and configuration of the locking sections 11 with their flanks 6 or 9 that generate the locking force are identical to the locking sections 11 of the connection element 20 according to FIGS. 3 and 4.

FIGS. 7 and 8 show another embodiment of a connection element 40 with the locking means 3. The features of the connection element 40 that are identical to the features of the connection elements 1, 20, 30 according to FIGS. 1 to 6 have been provided with the same reference numerals; in this context, reference is hereby made to the description relating to FIGS. 1 to 6.

The connection element 40 according to FIGS. 7 and 8 differs from the connection elements 20 and 30 according to FIGS. 3 to 6, among other things, in that the locking means 3 are arranged in two areas 13, 14 of the thread 2 along several consecutive windings of the thread 2. Several windings of the thread 2 without such locking means 3 are provided between the two areas 13, 14.

Here, the one area 13 is arranged approximately at the rear end of the shaft 17 of the connection element 40 that faces the head 16. As viewed in the axial direction, the other area 14 with the locking means 3 is situated approximately in the middle of the shaft 17 of the connection element 40.

The connection element 40 according to FIGS. 7 and 8 differs from the connection element 20 according to FIGS. 3 and 4 and from the connection element 30 of FIGS. 5 and 6, among other things, in that the flanks 6 that generate the locking force face the free end 12 of the shaft 17 and in that the flanks 9 that generate the locking force face the head 16 of the connection element 40.

Figure 10:
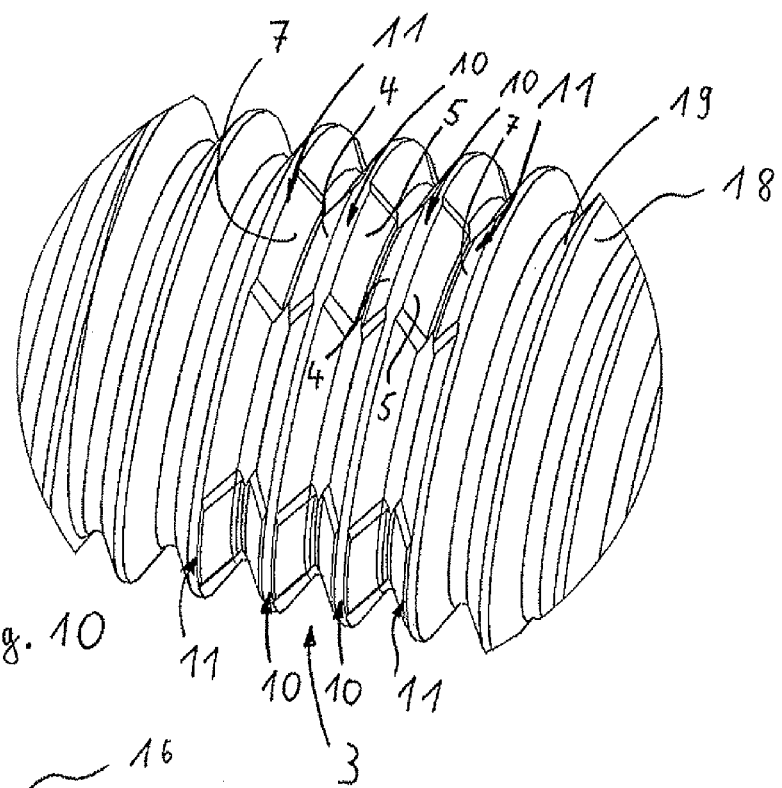
FIG. 10—an enlarged section of detail A of the connection element according to FIG. 9
Figure 9:
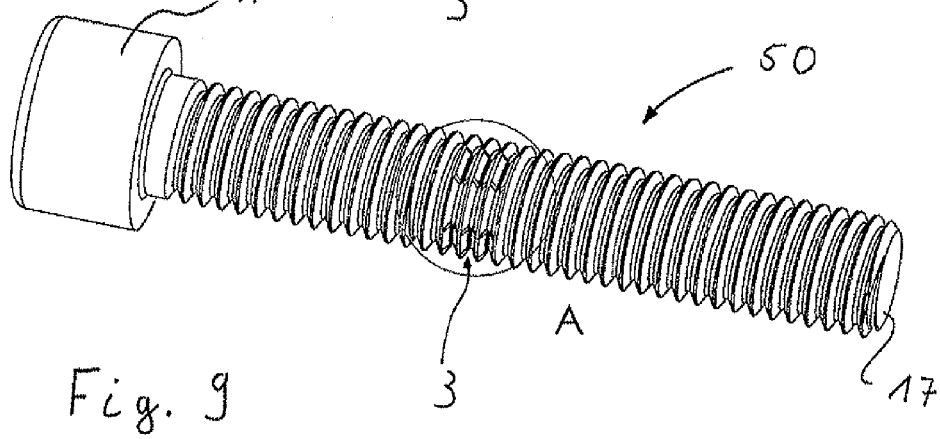
FIG. 9—a perspective view of yet another embodiment of a connection element with a thread and locking means.

FIGS. 9 and 10 show a connection element 50 in the form of a screw, in which the locking means 3 are formed by the locking sections 10 and additionally by the locking sections 11. The locking sections 10 and the locking sections 11 are provided on four consecutive windings of the thread 2. In this context, the locking sections 11 that only have the single flank 7 that generates the locking force are formed on the outer windings. The windings situated in-between have the locking sections 10 where the two flanks 4, 5 are configured so as to generate the locking force.

The locking sections 10, 11 are distributed along the appertaining winding. The locking sections 10 or 11 of adjacent windings are situated with respect to each other in such a way that the locking sections 10 or 11 form a row in the axial direction of the connection element 50, so that, depending on the number of locking sections 10 or 11 per winding, a corresponding number of windings is present.

Preferably, the single flank 7 of the locking sections 11 that generates the locking force is formed on the flank of the winding that is facing the next winding having the locking sections 10.

While preferred embodiments of the invention have been described and illustrated here, various changes, substitutions and modifications to the described embodiments will become apparent to those of ordinary skill in the art without thereby departing from the scope and spirit of the invention.

LIST OF REFERENCE NUMERALS

1 connection element, screw
2 thread
3 locking means
4 flank of a locking section
5 flank of a locking section
6 flank of a locking section
7 flank of a locking section
8 flank of a locking section
9 flank of a locking section
10 locking section
11 locking section
12 free end
13, 14 area
16 head
17 shaft
18 flank outside of the locking section
19 flank outside of the locking section
20 connection element, screw
30 connection element, screw
40 connection element, screw
50 connection element, screw

The invention claimed is:

1. A connection element (1) having a thread (2) adapted to engage with a mating thread, comprising:
 a locking means (3) to generate a locking force that acts upon the mating thread, wherein said locking means (3) is formed by at least a first flank (6) of at least one locking section (11) of the thread (2), and a second flank (9) of the at least one locking section (11) of the thread (2), with each flank having a radially stepped raised flank face that is offset from an adjacent thread face of the thread of the locking section along one winding of the thread (2) and is substantially parallel to the adjacent thread face of the thread of the locking section, and with the first flank offset from the second flank in axially opposite directions and distributed alternatingly with respect to one another along the one winding of the thread (2) so that when the thread (2) engages with the mating thread, the locking force is generated on at least one of the flanks (6, 9) of the locking section (11), and wherein two or more locking sections (11) are distributed along the one winding.

2. The connection element according to claim 1, wherein the arrangement of one of the flanks (6, 7, 8, 9) of the at least one locking section (11) is changed with respect to the other flank (7, 8) of the locking section (11).

3. The connection element according to claim 1, wherein the first flank (6) that generates the locking force is offset from an unraised thread face with the first flank having a flank face that is parallel to the flank (19) outside of the locking section (11; 11).

4. The connection element according to claim 1, wherein the locking section extends along multiple windings of the thread (2).

5. The connection element according to claim 4, wherein at least one winding without locking means is located between the windings with locking means (3).

6. The connection element according to claim 1, wherein in the case of two or more locking sections (11) of one winding of the thread (2), one of the flanks (6, 9) of the appertaining locking section (11) is adapted to generate the locking force.

7. The connection element according to claim 1, wherein one of the flanks (6, 9) of the appertaining locking sections (11) is adapted to alternatingly generate the locking force.

8. The connection element according to claim 1, wherein at least two consecutive windings of the thread (2) have locking sections (11; 11).

9. The connection element according to claim 8, wherein the flanks of adjacent windings face one another and are adapted to generate the locking force.

10. The connection element according to claim 9, wherein the flanks (6, 9) of adjacent windings that are adapted to generate the locking force are radially offset with respect to each other around a winding.

11. The connection element according to claim 9, wherein the locking sections (11) of adjacent windings are aligned radially with respect to each other.

12. The connection element according to claim 1, wherein the connection element (1) is a cold-formed part or a rolled formed part.

13. The connection element according to claim 1, wherein the radially stepped raised flank face of the at least first flank has a substantially flat raised flank face and angled sidewalls from the adjacent thread face to the raised flank face.

14. A method for lockably joining a connection element to a mating thread, comprising:
joining by screw connection a connection element (1) having a thread (2) to a mating thread, wherein the connection element comprises at least a first flank (6) of at least one locking section (11) of the thread (2), and a second flank (9) of the at least one locking section (11) of the thread (2), with each flank having a radially stepped raised flank face that is offset from an adjacent thread face of the thread of the locking section along one winding of the thread (2) and is substantially parallel to the adjacent thread face of the thread of the locking section, and with the first flank offset from the second flank in axially opposite directions, and distributed alternatingly with respect to one another along the one winding of the thread (2), and wherein two or more locking sections (11) are distributed along the one winding.

15. A threaded connection element with at least one locking section, comprising:
a thread with multiple windings, with the thread defining a thread tip of a uniform radial height along its axial length;
at least a first flank of the at least one locking section of the thread; and
at least a second flank of the at least one locking section of the thread, with each flank having a radially stepped raised flank face that is offset from an adjacent thread face of the thread of the locking section along one winding of the thread and is substantially parallel to the adjacent thread face of the thread of the locking section, and with the first flank offset from the second flank in axially opposite directions so that when the thread engages with a mating thread, the locking force is generated on at least one of the flanks of the locking section.

* * * * *